United States Patent [19]
Willman

[11] Patent Number: 5,886,709
[45] Date of Patent: Mar. 23, 1999

[54] GRAPHIC INPUT AND DISPLAY OF NETWORK BASED COMPUTATIONS

[76] Inventor: Todd J. Willman, 3419 San Vicente Ln., Katy, Tex. 77450

[21] Appl. No.: 879,175

[22] Filed: Jun. 20, 1997

Related U.S. Application Data

[63] Continuation-in-part of Ser. No. 259,857, Jun. 15, 1994, Pat. No. 5,651,105.

[51] Int. Cl.$^6$ .................................................... G06T 11/00
[52] U.S. Cl. ............................................................ 345/440
[58] Field of Search ............................................. 345/440

[56] References Cited

U.S. PATENT DOCUMENTS 5,651,105   7/1997   Willman .................................. 345/440

*Primary Examiner*—Almis R. Jankus
*Attorney, Agent, or Firm*—Carothers & Carothers

[57] ABSTRACT

An automated system to draw detailed networks for use in various types of engineering analysis and simulations. Nodes can be activated from a set of available node sites. Elements between nodes are automatically drawn by specifying the node start and node end of each element and selecting a draw command and utilizing stored data arrays and graphical software system for input and display of network based computations. A speed draw command can alternatively activate the next node site for the direction command selected and connect the starting and ending nodes with the next available element in a single command. Elements can also contain various attribute types that are displayed and edited on an element toolbar when elements are selected. Values stored in unique data arrays are then available for use in engineering computations.

2 Claims, 3 Drawing Sheets

Figure 1: Unique Data Arrays for a Coordinate Based Network Drawing System:

BXFAC( ) Horizontal or "X" coordinate array that stores the graphic screen "X" coordinate for each node site or button. These coordinates start in Row #1, Column #1 and go to Row #1, Column #n and then to Row #2, Column #1, etc. The size of this data array equals the number of possible node sites or buttons.

BYFAC( ) Vertical or "Y" coordinate array that stores the graphic screen "Y" coordinate for each node site or button. These coordinates start in Row #1, Column #1 and go to Row #1, Column #n and then to Row #2, Column #1, etc. The size of this data array equals the number of possible node sites or buttons.

BTNSWT( ) Node site or button switch array to indicate if a node site or button has been activated. The size of this data array equals the number of possible node sites or buttons.

BREF( ) Node site or button reference array that indicates the button control number that is assigned to each selected node number. For example if node #7 is assigned to node site or button #12 then BREF(7) = 12. The size of this data array equals the number of possible node sites or buttons.

NSTART( ) Node start number as assigned by BREF( ) for each connecting element between node sites or buttons. The size of this data array equals the number of possible elements.

NEND( ) Node end number as assigned by BREF( ) for each connecting element between node sites or buttons. The size of this data array equals the number of possible elements.

Figure 2: Determination of Coordinates for specified node or button:

BXFAC(BREF(NSTART(ElementNumber))) For the specified Element, the Node Start number is identified by the NSTART array and used in the BREF array to determine which node site or button control number represents the node number specified. This node site or button control number determined by the BREF array is then used in the BXFAC array to return the actual screen horizontal or "X" coordinate for the selected node number. This BXFAC array is also used to determine the node end horizontal or "X" coordinate so that the graphic element can be drawn between the starting and ending nodes.

BYFAC(BREF(NSTART(ElementNumber))) For the specified Element, the Node Start number is identified by the NSTART array and used in the BREF array to determine which node site or button control number represents the node number specified. This node site or button control number determined by the BREF array is then used in the BYFAC array to return the actual screen vertical or "Y" coordinate for the selected node number. This BYFAC array is also used to determine the node end vertical or "Y" coordinate so that the graphic element can be drawn between the starting and ending nodes.

Figure 3: Process for Coordinate Based Network Drawing System:

Assign Nodes:
NodeButton_Gotfocus(index)  (index = 0 to n-1 nodes)
NodeNo = Val(NodeNumber.Text) [or] NodeNo = LargestNodeNo + 1
If NodeNo > 0 Then BTNSWT(NodeNo) = 1 Else  BTNSWT(NodeNo) = 0
Button(index).Caption = Str$(NodeNo)
BREF(NodeNo) = index + 1
End Sub

Draw Elements:
DrawButton_Click( )
ElementNo = Val(PipeNumber.Text)
X1 = BXFAC(BREF(NSTART(ElementNo)))
Y1 = BYFAC(BREF(NSTART(ElementNo)))
X2 = BXFAC(BREF(NEND(ElementNo)))
Y2 = BYFAC(BREF(NEND(ElementNo)))
Element.Coord (X1,Y1) - (X2,Y2)
Element.Label = PipeNumber.Text
End Sub

Speed Draw to Assign Nodes and Draw Elements:
SpeedDrawButton_Click( )
ElementNo = LargestElementNo + 1:LargestElementNo = ElementNo
NSTART(ElementNo) = Nodebutton.Selected [current selected node is the start node]
index = NodeButton.Selected [next available node site is activated in direction selected]
NEND(ElementNo) = NodeButton.Selected
NodeNo = LargestNodeNo + 1:BTNSWT(NodeNo) = 1
Button(index).Caption = Str$(NodeNo)
BREF(NodeNo) = index +1
X1 = BXFAC(BREF(NSTART(ElementNo)))
Y1 = BYFAC(BREF(NSTART(ElementNo)))
X2 = BXFAC(BREF(NEND(ElementNo)))
Y2 = BYFAC(BREF(NEND(ElementNo)))
Element.Coord (X1,Y1) - (X2,Y2)
Element.Label = PipeNumber.Text
End Sub

Figure 4: Interface for graphic input and display of network based computations
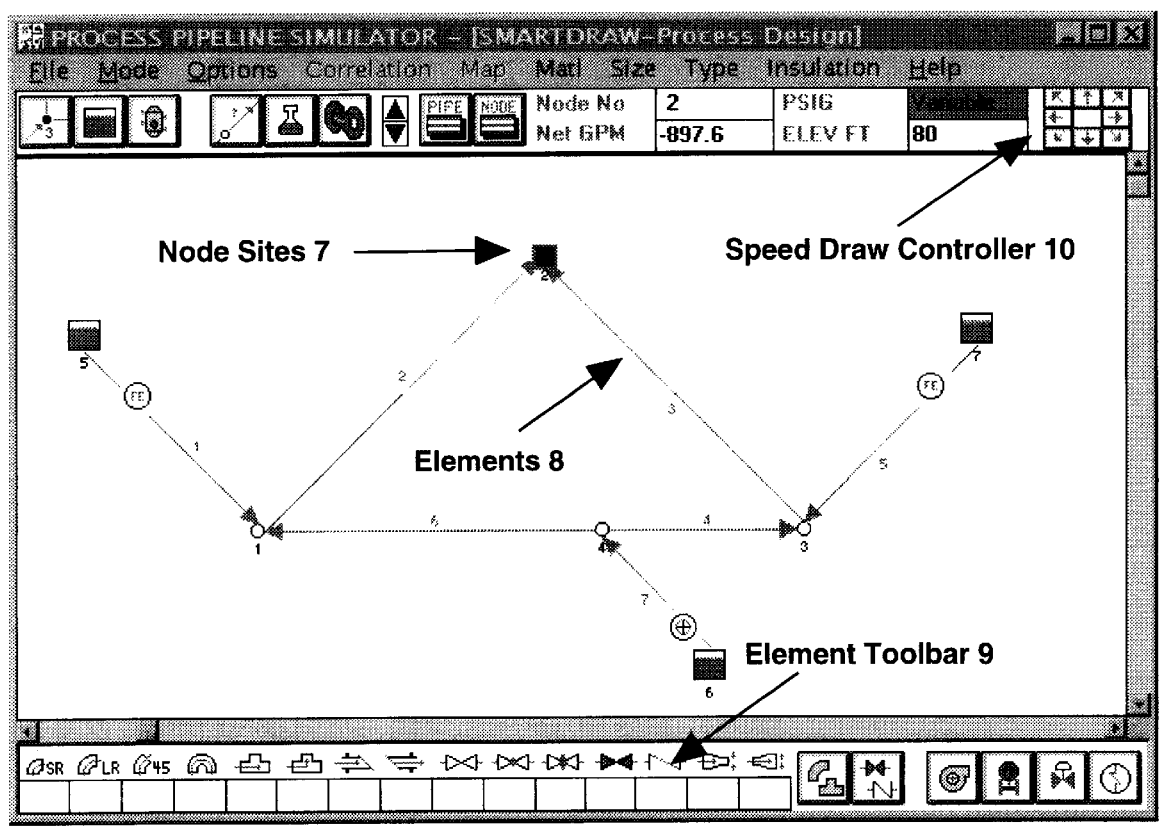

GRAPHIC INPUT AND DISPLAY OF NETWORK BASED COMPUTATIONS

This application is a continuation-in-part of application Ser. No. 08/259,857, filed Jun. 15, 1994, now U.S. Pat. No. 5,651,105.

BACKGROUND

1. Field of Invention

The present invention relates to the automatic drawing of elements between nodes of a network system and more specifically to the graphic input and display of network systems commonly utilized in engineering computations.

2. Prior Art

Presently, the development of network systems has been done manually or inefficiently with traditional drawing or CAD software. Network system simulation and analysis is used in structural engineering, hydraulic engineering, thermodynamic engineering, etc. to solve a wide variety of engineering problems. Complex networks need to be drawn to provide a clear presentation of the problem that is being solved, and to provide the connection data for network based computations. The network system drawing consists of nodes or junctions and elements or pipelines between the nodes. The nodes and elements are typically numbered to provide reference to the engineering formula utilized in solving network based computations. The primary concerns in drawing a network system are to properly identify all the nodes and elements, their connections, and the specified attributes of nodes and elements.

The traditional CAD approach to drawing network systems requires that each node of the network be physically drawn and located. Since the nodes and elements of a network system drawing do not require any exact placement, there is no requirement of network based computations for a precision drawing environment which is used by traditional CAD or drawing software. This type of approach has required the user to enter into a node entry mode and then place the nodes on the drawing. Then, additional effort may be required to place the nodes so that they are aligned with each other. To connect the nodes with elements, the user then selects an element entry mode. The user must carefully click or select the start node and drag the element until the end node becomes highlighted to insure that the connection between nodes is accomplished. If the user improperly clicks the pointing device before selecting the node, the element could be shown but the connection with the desired node may not have been accomplished without the user realizing this deficiency.

The use of a graphic system for input and display of network based computations as detailed below avoids the problem of insuring connection and alignment between nodes associated with traditional CAD drawing software approaches. This is accomplished by utilizing preset node sites that can be activated as desired. The coordinates of each node are identified through a set of unique data arrays to allow specified elements to be directly connected between nodes which can be repeated with a single speed draw controller command. This approach to network based computations is more direct and efficient while providing a clearer and more compact presentation of a network system.

SUMMARY OF THE INVENTION

Objects and Advantages

The Invention consists of a single common network drawing interface along with unique data arrays to allow for graphic input and display of network elements between specified node sites. This coordinate based network drawing system is processed through the random access memory area of a generic data processor. The general data processor is a personal computer system designed to operate under the MSDOS®, Windows®, Macintosh®, or similar operating systems. The processor would typically consist of a display monitor, keyboard, pointing device, printer, and central processing unit with random access memory, removable disk drive, and fixed disk drive. The single common network drawing interface contains a set of available node sites that are assigned a specific node number as they are activated. Elements between nodes are automatically drawn using the coordinate based network drawing system by specifying the element's node start and node end and selecting a draw command. Alternatively, a speed draw controller consisting of a set of directional commands activates an additional node in the direction selected and draws an element between the newly activated end node and the currently selected start node with a single command. Elements can be removed by entering the element number and selecting the Erase button, or by selecting the element with a pointing device and then selecting the Erase button or another available deletion command.

Unique data arrays are used to store coordinate and reference data for each node and element in the fixed disk storage area of the general data processor. These arrays allow for automatic drawing of elements between nodes for any set of specified node sites. Additionally, these arrays provide data necessary for the engineering computations involved with network system simulation and analysis.

A modern computer interface design including pull-down menus, toolbars, and command buttons is used in the single common network drawing interface. This allows the user to quickly become efficient in the operation of this process system. These designs are found in many other commercial software packages that are commonly used on current graphical-based operating systems such as Microsoft Windows®. These interface designs have proven to provide increased use and proficiency over single step keyboard entry systems as is used in earlier MSDOS® systems.

The advantage of using a graphic system for input and display of network based computations is that it can automatically draw network elements between nodes with the alignment and connection of each node and element guaranteed. The use of a speed draw controller can also activate the next node site for the direction command selected and connect an element between the start and end node in a single command. The invention as claimed allows network drawings to be more efficiently produced while providing a clearer and more compact presentation. Additionally, the values stored in the unique data arrays can be directly used in the engineering computations typically required for network simulation and analysis.

BRIEF DESCRIPTION OF THE DRAWINGS

Other advantages of the invention become apparent upon reading the following detailed description and upon referral to the drawings of which:

FIG. 1 describes the unique data arrays required for determining the coordinates of specified node sites for direct connection of elements between nodes.

FIG. 2 describes how the coordinates of specified node sites are determined using the unique data arrays.

FIG. 3 describes the detail program code required for the process of a graphic system for input and display of network based computations.

FIG. 4 shows an interface for graphic input and display of network based computations.

REFERENCE NUMERALS IN DRAWINGS

1 BXFAC( ) horizontal coordinate data array
2 BYFAC ( ) vertical coordinate data array
3 BTNSWT( ) node/button switch data array
4 BREF( ) node/button reference data array
5 NSTART( ) node start data array
6 NEND( ) node end data array
7 Node sites
8 Elements
9 Element toolbar
10 Speed draw controller
11 Draw command
12 Interface for graphic input and display of network based computations While the invention is susceptible to various modifications and alternative forms, a specific embodiment of the invention is described in detail below. This description is not intended to limit the invention to the particular form disclosed, but the invention is to cover all modifications and alternatives falling within the scope of the invention as defined by the claims below. Such modifications could include the use of different data array structures to accomplish the same type of node site coordinate determination, the use of a different screen layout for the graphic input and display of network based computations, etc.

DESCRIPTION OF PREFERRED EMBODIMENT

Several unique data arrays are utilized as shown in FIG. 1 for the process of graphic input and display of network based computations. The BXFAC( ) 1 data array is used to identify the horizontal coordinate of any activated node site. And, the BYFAC( ) 2 data array is used to identify the vertical coordinate of any activated node site. The BTNSWT( ) 3 data array is used to indicate if a node site is activated. The BREF( ) 4 data array references the control number assigned to each activated node for use in determining the coordinates and activation state of each node site. The NSTART( ) 5 and NEND( ) 6 data arrays contain the starting and ending node number for each element.

Coordinates are determined for each node site by evaluating the BXFAC( ) 1 and BYFAC ( ) 2 data arrays for the start and end node of each element as shown in FIG. 2. The control number used in these arrays is determined using the BREF( ) 4 reference data array for the NSTART( ) 5 or NEND( ) 6 being specified. Once the coordinates are determined for the starting and ending nodes, the element can be directly drawn between these nodes with a guaranteed connection.

FIG. 3 provides the details on the coding required for the for graphic input and display of network based computations. When a NodeSite(index) 7 site is activated from the set of available node sites, the NodeNo variable is retrieved from the Node Number text input box or the largest node number plus one is assigned when using the speed draw controller 10. This BTNSWT(NodeNo) 3 array value is then set from 0 to 1 to indicate the node is activated. The caption for the node site that was just activated is also changed to the entered node number for the draw mode or the largest node number plus one for the speed draw mode, as well. The BREF(NodeNo) 4 array value is also assigned to the control number for the node site (index+1). For the computer language shown, the index variables is one digit less than the variables used in the data arrays.

The speed draw controller 10 will activate the next available node site 7 for the direction command selected and draw the next available element 8 between the current selected start node and the newly activated end node in a single command. The draw command 11 will draw an element 8 between the specified node start and node end locations. When selecting an element 8, a wide variety of various attributes can be specified and associated with the element after it is drawn from an element toolbar 9. For the pipeline example shown in FIG. 4, this would allow the inclusion of various types of fitting, valves, and process equipment in the pipeline element to be specified in a pipeline element toolbar. The X1, X2 coordinates are obtained from the BXFAC( ) 1 data array, and the Y1, Y2 coordinates are obtained from the BYFAC( ) 2 data array. The element 8 can then be drawn between coordinates X1, Y1 and X2, Y2 with the element number displayed on the element 8. Attributes for the element 8 are placed on the element 8 as they are specified such as equipment, directional arrows, load indicators, etc. For erasing an element 8, select it and choose any available deletion command.

An interface for the graphic input and display of network based computations 12 is shown in FIG. 4. Nodes are activated at specific and available node site locations using the node tool and the pointer device. If the node number is selected in the node number input box, the node label will appear on the newly selected and activated node site and the BREF( ) 4 data array is updated. The BTNSWT( ) 3 data array is also updated to indicate the selected node site is activated.

In FIG. 4, pipelines are the elements 8 between node sites 7. The next available element 8 and node site 7 are activated and displayed in the direction selected of the speed draw controller 9. Alternatively, pipeline elements can be drawn by entering the pipe number, the node start, the node end, and selecting the draw command 10. In this example, the direction of flow through the pipelines is also shown which are updated after the engineering computations are performed. When the network has been fully specified, the appropriate engineering computations can be applied using the network specification identified in the unique data arrays of the graphic system for input and display of network based computations.

In summary, this process for graphic input and display of network based computations utilizing unique data arrays allows for an efficient and compact network drawing with a minimal amount of effort. This process could also be utilized for any category of software programs that need to graphically represent a networking system.

What is claimed is:

1. A process for drawing a network system to perform analysis computations and simulations utilizing data arrays residing in a random access memory of a general data processor of known type for enabling said general data processor to retain coordinate and connection data of specified network elements between designated network node sites for use in displaying said network system on a connected display of said general data processor and performing said analysis computations and simulations for said network system, said process comprising the steps of:

a. storing in said random access memory of said general data processor a set of available said network node sites at specific coordinate positions on said connected display screen of said general data processor;

b. designating said network node sites and storing in said random access memory of said general data processor the coordinate and reference data for each designated said network node site for use in connecting said network elements between said network nodes;

c. adding or deleting said network elements between said network node sites by specifying and storing in said data arrays the start and end designation of said network nodes for each said network element and executing a command;

d. graphically displaying said network elements between said network nodes on said connected display screen of said general data processor utilizing information stored in said data arrays without any further action required by a user;

e. activating the next available said network node site for the direction selected on a speed draw controller from the currently selected said network node site and adding the next available said network element between the currently selected said network node site and the newly activated said network node site;

f. assigning attributes to any said network element by selecting said network element and specifying the attributes in an element toolbar;

g. upon further command performing said analysis computations and simulations using said connection data of said network system stored in said data arrays.

2. An apparatus for drawing a network system to perform analysis computations and simulations and including a general data processor of known type with a connected display and utilizing data arrays residing in a random access memory of said general data processor for enabling said general data processor to retain coordinate and connection data of specified network elements between designated network node sites for use to display said network system on said connected display of said general data processor to perform said analysis computations and simulations for said network system, said apparatus comprising:

a. a set of available said network node sites at specific coordinate positions that are stored in said random access memory of said general data processor on said connected display of said general data processor;

b. means for designating said network node sites and storing in said random access memory of said general data processor the coordinate and reference data for each designated said network node site for use in connecting said network elements between said network nodes;

c. means for adding or deleting said network elements between said network node sites by specifying and storing in said data arrays the start and end designation of said network nodes for each said network element upon execution of a command;

d. said general data processor programmed to graphically display said network elements between said network node sites utilizing information stored in said data arrays without any further action required by a user;

e. means for activating the next available said network node site in the direction desired from the currently selected said network node site and adding the next available said network element between the currently selected said network node site and newly activated said network node site upon execution of a command;

f. means for assigning attributes to any said network element by selecting said network element and specifying the attributes within an element toolbar; and g. said general data processor further programmed to perform said analysis computations and simulations using said connection data of said network system stored in said data arrays upon execution of a command.

\* \* \* \* \*